United States Patent
Zhodzishsky et al.

(10) Patent No.: US 12,548,806 B2
(45) Date of Patent: Feb. 10, 2026

(54) BATTERY MANAGEMENT SYSTEM, METHOD OF BATTERY MANAGEMENT AND WIRELESS COMMUNICATION DEVICE FOR BATTERY MANAGEMENT SYSTEMS

(71) Applicant: Cypress Semiconductor Corporation, San Jose, CA (US)

(72) Inventors: Victor Zhodzishsky, Potomac, MD (US); Haram Kim, Seoul (KR); Manamohan D. Mysore, Ramona, CA (US); Joon Ha Park, Songpa-gu (KR); Sang Je Lee, Gyeonggi-do (KR)

(73) Assignee: Infineon Technologies Americas Corp., El Segundo, CA (US)

( * ) Notice: Subject to any disclaimer, the term of this patent is extended or adjusted under 35 U.S.C. 154(b) by 543 days.

(21) Appl. No.: 18/071,993

(22) Filed: Nov. 30, 2022

(65) Prior Publication Data
US 2024/0178463 A1 May 30, 2024

(51) Int. Cl.
*H01M 10/42* (2006.01)
*H01M 10/63* (2014.01)
(Continued)

(52) U.S. Cl.
CPC .......... *H01M 10/425* (2013.01); *H04L 67/12* (2013.01); *H01M 2010/4271* (2013.01);
(Continued)

(58) Field of Classification Search
CPC ....... H01M 10/425; H01M 2010/4271; H01M 2010/4278; H01M 50/284; H01M 10/63; H04L 67/12; H04L 63/10
See application file for complete search history.

(56) References Cited

U.S. PATENT DOCUMENTS

2016/0345317 A1* 11/2016 Levesque .............. H04W 40/02
2017/0331159 A1* 11/2017 Keser ................ H01M 10/4257
(Continued)

FOREIGN PATENT DOCUMENTS

WO    WO-2022155745 A1 * 7/2022

OTHER PUBLICATIONS

AES (AES 7170 IP-Link Transceiver Installation and Operation Manual, AES IntelliNet, 40-7170 Revision 2C-1 Jan. 23, 2017) (Year: 2017).*

(Continued)

*Primary Examiner* — Lisa M Caputo
*Assistant Examiner* — Christian T Bryant

(57) ABSTRACT

A battery management system includes: a battery management unit; battery management integrated circuits (ICs) configured to receive measurement data from battery modules; a first wireless communication device configured as a primary aggregator to receive wireless transmissions of the measurement data from the battery management ICs and communicate the measurement data received by the first wireless communication device to the battery management unit; and a second wireless communication device configured as a secondary aggregator to monitor the wireless transmissions of the measurement data from the battery management ICs to the primary aggregator and communicate the measurement data received by the second wireless communication device to the battery management unit. The battery management unit is configured to manage the battery modules based on the measurement data provided to the battery management unit.

26 Claims, 6 Drawing Sheets

(51) Int. Cl.
*H01M 50/284* (2021.01)
*H04L 9/40* (2022.01)
*H04L 67/12* (2022.01)

(52) U.S. Cl.
CPC .... *H01M 2010/4278* (2013.01); *H01M 10/63* (2015.04); *H01M 50/284* (2021.01); *H04L 63/10* (2013.01)

(56) References Cited

U.S. PATENT DOCUMENTS

| | | | |
|---|---|---|---|
| 2018/0206285 A1* | 7/2018 | Tian | H04W 36/035 |
| 2019/0242949 A1* | 8/2019 | Lemkin | H01M 10/42 |
| 2020/0335831 A1* | 10/2020 | Lee | G01R 31/392 |
| 2022/0240190 A1* | 7/2022 | Hong | H04B 17/318 |
| 2022/0332213 A1* | 10/2022 | Xhafa | B60L 53/66 |
| 2024/0069110 A1* | 2/2024 | Kunduru | H01M 10/4257 |

OTHER PUBLICATIONS

Lee et al. ("Wireless battery management system," 2013 World Electric Vehicle Symposium and Exhibition (EVS27), Barcelona, Spain, 2013, pp. 1-5, doi: 10.1109/EVS.2013.6914889.) (Year: 2013).*

* cited by examiner

BATTERY MANAGEMENT SYSTEM, METHOD OF BATTERY MANAGEMENT AND WIRELESS COMMUNICATION DEVICE FOR BATTERY MANAGEMENT SYSTEMS

BACKGROUND

Battery management systems are electronic control circuits that monitor and regulate charging and discharging of batteries. Battery characteristics typically monitored include battery type, voltage, temperature, capacity, state of charge, power consumption, remaining operating time, charging cycle, and other characteristics. Battery management systems ensure optimal battery energy use and protect against deep discharge and over-voltage. In the case of multi-cell batteries, battery management systems also provide a cell balancing function such that different battery cells have approximately the same charging and discharging requirements.

Battery management integrated circuits (ICs) included in battery management systems receive measurement data from the battery modules. The battery modules may be Li-ion battery packs used in hybrid electric vehicles (HEV), plug-in hybrid electric vehicles (PHEV), battery electric vehicles (BEV), 12 V Li-ion batteries, etc. A battery management unit manages the battery modules through the battery management ICs, based on battery data reported by the battery management ICs.

Conventional battery management systems have either a wired connection or a single aggregator such as a single Bluetooth Low Energy (BLE) device between the battery management ICs and the battery management unit. Performance of the battery management system suffers in the event of non-optimal aggregator operation, and the battery management system must cease operation if the aggregator fails.

Thus, there is a need for an improved battery management system and battery management methodology.

SUMMARY

According to an embodiment of a battery management system, the battery management system comprises: a battery management unit; a plurality of battery management integrated circuits configured to receive measurement data from a plurality of battery modules; a first wireless communication device configured as a primary aggregator to receive wireless transmissions of the measurement data from the battery management integrated circuits and communicate the measurement data received by the first wireless communication device to the battery management unit; and a second wireless communication device configured as a secondary aggregator to monitor the wireless transmissions of the measurement data and communicate the measurement data received by the second wireless communication device to the battery management unit, wherein the battery management unit is configured to manage the battery modules based on the measurement data provided to the battery management unit.

According to an embodiment of a method of battery management, the method comprises: receiving, at a plurality of battery management integrated circuits, measurement data from a plurality of battery modules; configuring a first wireless communication device as a primary aggregator and a second wireless communication device as a secondary aggregator; receiving wireless transmissions of the measurement data from the battery management integrated circuits at the first wireless communication device and communicating the measurement data received by the first wireless communication device to a battery management unit; monitoring the wireless transmissions of the measurement data by the second wireless communication device and communicating the measurement data received by the second wireless communication device to the battery management unit; and managing the battery modules based on the measurement data received by the battery management unit.

According to an embodiment of a wireless communication device, the wireless communication device comprises: a transceiver; memory configured to store configuration information that determines whether the wireless communication device is configured as a primary aggregator or a secondary aggregator of a battery management system; and a processor, wherein if the wireless communication device is configured as the primary aggregator, the processor is configured to coordinate wireless transmissions of measurement data from a plurality of battery management integrated circuits to the wireless communication device and communicate the measurement data received by the transceiver to a battery management unit of the battery management system, wherein if the wireless communication device is configured as the secondary aggregator, the processor is configured to monitor, via the transceiver, the wireless transmissions of the measurement data from the plurality of battery management integrated circuits to another wireless communication device configured as the primary aggregator and communicate the measurement data received by the transceiver to the battery management unit.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide aggregator redundancy for battery management systems by providing both a primary aggregator and a secondary (redundant) aggregator that is configured to seamlessly replace the primary aggregator. The primary aggregator is implemented as a wireless communication device that receives wireless transmissions of measurement data from battery management ICs and communicates the measurement data to a battery management unit of the battery management system. A second wireless communication device configured as the secondary aggregator monitors the wireless transmissions of the measurement data from the battery management ICs to the primary aggregator and communicates the measurement data received by the secondary aggregator to the battery management unit.

The battery management unit manages the battery modules of the battery management system based on measurement data provided by the primary aggregator and/or the secondary aggregator. In the case of Bluetooth Low Energy (BLE) wireless communication devices, network provisioning data such as Bluetooth device addresses, device keys, address keys, etc. may be copied from the primary aggregator to the secondary aggregator to ensure that the secondary aggregator can process data from battery management ICs and/or assume the role of primary aggregator without the battery management system having to first stop, shut down, or perform network provisioning. Even if the primary aggregator does not fail or otherwise require replacement, the battery management unit may still use the measurement data provided by the secondary aggregator as part of the battery management methodology, e.g., in case the primary aggregator fails to report or drops measurement data reported by one or more of the battery management ICs. The battery management unit may use measurement data reported by the secondary aggregator as a substitute for any missing or corrupted measurement data on the primary aggregator side.

Described next, with reference to the figures, are exemplary embodiments of the battery management system, wireless communication device, and battery management method.

Figure 1:
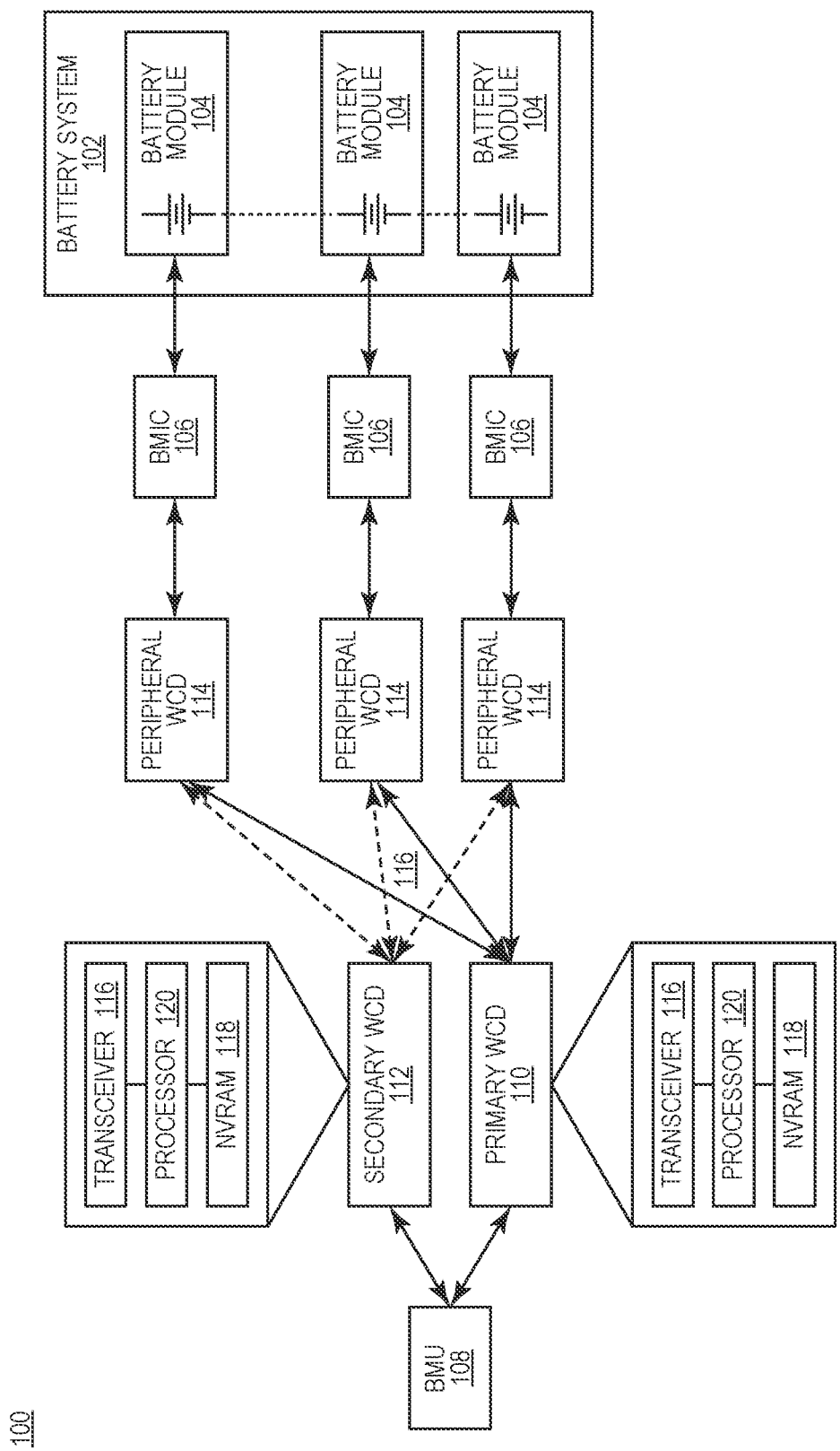
FIG. 1 illustrates a block diagram of an embodiment of a battery management system.
Figure 2:
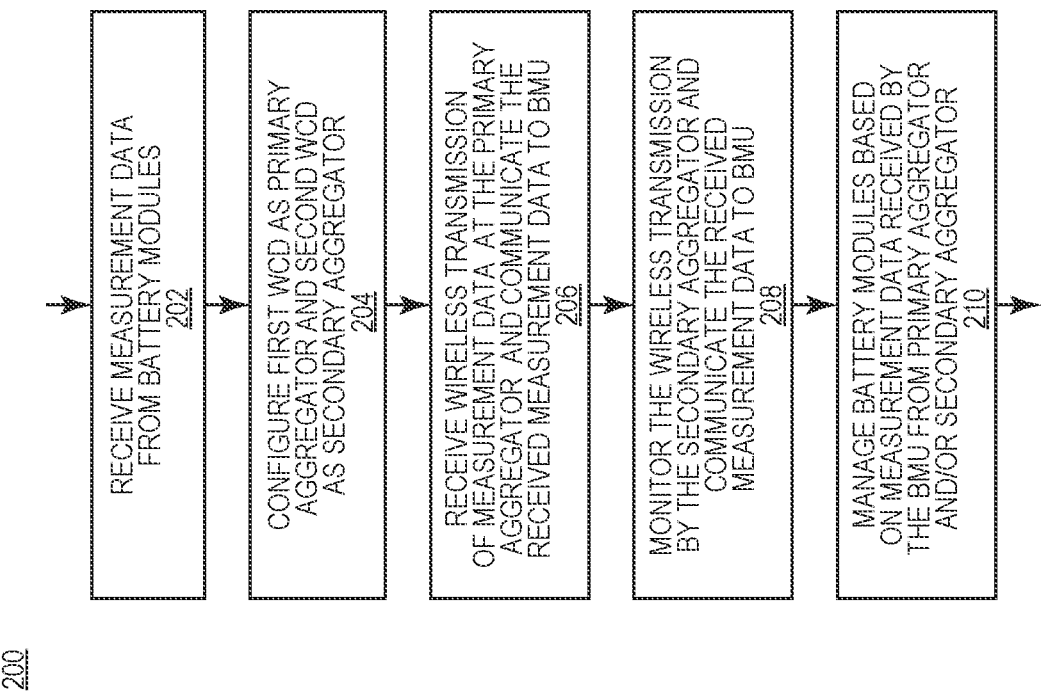
FIG. 2 illustrates a flow diagram of an embodiment of a battery management method.

FIG. 1 illustrates an embodiment of a battery management system 100. FIG. 2 illustrates an embodiment of a battery management method 200 implemented by the battery management system 100.

The battery management system 100 includes a battery system 102 of battery modules 104, battery management ICs (BMICs) 106 that send commands to the battery modules 104 and receive measurement data from the battery modules 104 (Block 202, FIG. 2), and a battery management unit (BMU) 108 that manages the battery modules 104 of the battery system 102 based on measurement data reported to the BMU 108.

The battery management system 100 also includes a first wireless communication device (WCD) 110 initially configured as a primary aggregator and a second wireless communication device 112 initially configured as a secondary aggregator (Block 204, FIG. 2). The primary aggregator receives wireless transmissions of measurement data from the BMICs 106 and communicates the measurement data received by the first wireless communication device 110 to the BMU 108 (Block 206, FIG. 2). The secondary aggregator monitors the wireless transmissions of the measurement data from the BMICs 106 to the primary aggregator and communicates the measurement data received by the second wireless communication device 112 to the BMU 108 (Block 208, FIG. 2). The BMU 108 manages the battery modules 104 of the battery system 102 based on the measurement data provided by the primary aggregator and/or the secondary aggregator (Block 210, FIG. 2). For example, the BMU 108 may ensure optimal battery energy use, protect against deep discharge and over-voltage, implement cell balancing such that battery cells within the battery modules 104 have approximately the same charging and discharging requirements, etc.

The data measured at the battery modules 104 and reported to the BMICs 106 may include battery type, voltage, temperature, capacity, state of charge, power consumption, remaining operating time, charging cycle, etc. Peripheral wireless communication devices 114 included in or connected to the BMICs 106 wirelessly communicate the measurement data to the primary aggregator, e.g., by broadcasting the measurement data over the air during time slots assigned by the primary aggregator. In one embodiment, the wireless communication devices 110, 112, 114 are BLE wireless communication devices such as BLE transceivers. According to this embodiment, the primary aggregator implements Bluetooth provisioning whereby a previously unprovisioned peripheral wireless communication device 114 is added to a Bluetooth mesh network 116. The Bluetooth mesh protocol defines the provisioning protocol, which in turn defines the PDUs (packet data units) used to communicate between the primary aggregator and a new, un-provisioned peripheral wireless communication device 114 during the provisioning process.

Either the first wireless communication device 110 or the second wireless communication device 112 may be configured as the primary aggregator, with the other one of the first wireless communication device 110 and the second wireless communication device 112 being configured as the secondary aggregator. This way, if the wireless communication device 110 or 112 configured as the primary aggregator fails, has suboptimal performance (e.g., dropped or corrupted packets), requires maintenance, or otherwise becomes unavailable, the other wireless communication device 112 or 110 seamlessly assumes the role as the primary aggregator without the battery management system 100 having to first stop, shut down, or perform network provisioning.

Even if a change in aggregator status does not occur between the first and second wireless communication devices 110 and 112, the BMU 108 may still use the measurement data provided by the secondary aggregator to manage the battery modules 104 of the battery system 102. For example, the primary aggregator may report incomplete, missing, or corrupted measurement data for one or more of the battery modules 104 and the BMU 108 may use the measurement data reported by the secondary aggregator to fill-in any gaps in the measurement data reported by the primary aggregator. Such functionality is possible by configuring the secondary aggregator based on the same wireless network connectivity information used by the primary aggregator, which allows the secondary aggregator to monitor the wireless communication between the BMICs 106 and the primary aggregator.

Both the first wireless communication device 110 and the second wireless communication device 112 may include a transceiver 116 such as a Bluetooth transceiver, memory 118 such as nonvolatile memory (NVRAM), and a processor 120 such as a microprocessor, controller, ASIC (application-specific IC), etc. The transceiver 116 includes radio transmitter and receiver circuitry, including modulation and demodulation circuitry. The memory 118 stores configuration information that determines whether the corresponding wireless communication device 110, 112 is configured as the primary aggregator or the secondary aggregator.

The processor 120 for the wireless communication device 110 or 112 configured as the primary aggregator coordinates wireless transmission of measurement data from the BMICs 106 to that wireless communication device 110 or 112 and communicates the measurement data received by its transceiver 116 to the BMU 108. The processor 120 for the wireless communication device 112 or 110 configured as the secondary aggregator monitors, via its transceiver 116, the wireless transmissions of the measurement data from the BMICs 106 to the other wireless communication device 110 or 112 configured as the primary aggregator and communicates the measurement data received by its transceiver 116 to the BMU 108. Accordingly, primary and secondary aggregator status can be changed between the first and second wireless communication devices 110 and 112 without the battery management system 100 having to first stop, shut down, or perform network provisioning.

For the secondary aggregator to monitor the wireless transmissions of measurement data from the BMICs 106 to the primary aggregator, the secondary aggregator must be aware of the communication protocol in place between the primary aggregator and the BMICs 106. In the following description of the secondary aggregator learning about timing of the communication protocol implemented by the primary aggregator, the primary aggregator may be the first wireless communication device 110 and the secondary aggregator may be the second wireless communication device 112 or vice-versa, as explained above.

In one embodiment, the secondary aggregator monitors wireless transmissions from the primary aggregator to the BMICs 106 to determine timing of the communication protocol used by the primary aggregator and the BMICs 106. The communication protocol defines how the BMICs 106 report measurement data received from the battery modules 104 to the primary aggregator. In another embodiment, the primary aggregator communicates the communication protocol timing information to the secondary aggregator over a wireless or wired connection, e.g., a UART (universal asynchronous receiver-transmitter) wired connection or a Bluetooth LE ACL wireless connection. For example, the primary aggregator may transfer the state information stored in its memory 118 in a suitable log format from time to time, allowing the secondary aggregator to monitor or snoop the activities of the primary aggregator.

If a change is expected to the wireless network 115, the primary aggregator can summarize the change to the secondary aggregator before the change takes place. This way, the secondary aggregator is prepared to continue monitoring the wireless transmissions of measurement data from the BMICs 106 to the primary aggregator when the network change occurs.

Communication between the primary and secondary aggregators may be facilitated by a microcontroller unit that controls both devices, for example. Synchronization information provided by the primary aggregator to the secondary aggregator may help the secondary aggregator to maintain wireless network context.

In another embodiment, the BMU 108 communicates the communication protocol timing information to the secondary aggregator. In each case, and once the secondary aggregator is aware of the communication protocol timing in force between the primary aggregator and the BMICs 106, the secondary aggregator may monitor the wireless transmissions from the BMICs 106 to the primary aggregator to receive the measurement data being reported by the BMICs 106.

Figure 3:
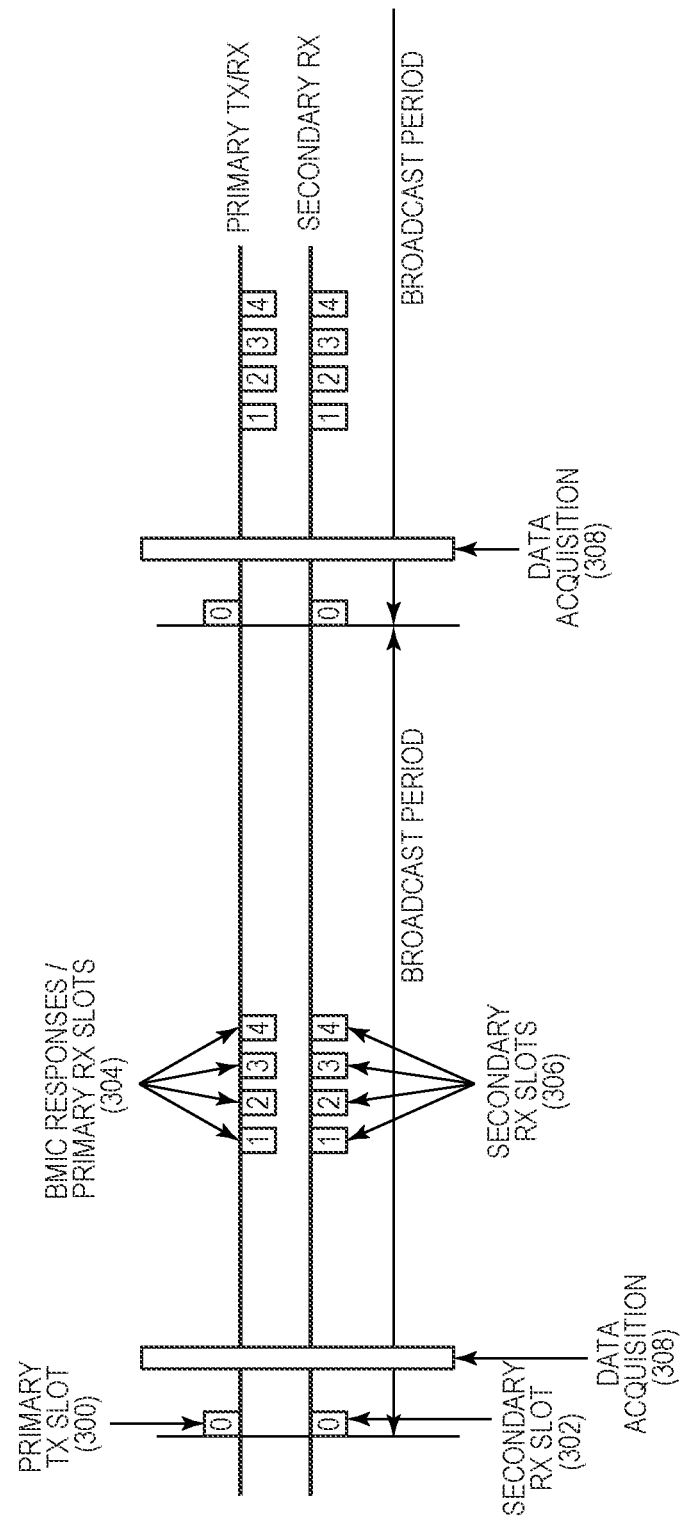
FIG. 3 illustrates an embodiment of a secondary aggregator monitoring wireless transmissions from a primary aggregator to battery management ICs of a battery management system.

FIG. 3 illustrates an embodiment of the secondary aggregator monitoring wireless transmissions from the primary aggregator to the BMICs 106 to determine timing of the communication protocol used by the primary aggregator and the BMICs 106. Two (2) broadcast periods are shown in FIG. 3. During a transmit (TX) window 300 for the primary aggregator, the primary aggregator wirelessly transmits communication protocol timing information to the BMICs 106 in slot '0'. The secondary aggregator monitors the wireless transmissions during the primary aggregator transmit window 300 and receives 302 the communication protocol timing information. During a receive (RX) window for the primary aggregator, the BMICs 106 wirelessly transmit the measurement data received from the battery modules 104 to the primary aggregator in accordance with the communication protocol. The communication protocol allocates time slots (slots '1', '2', '3', '4', . . . ) to the BMICs 106 for transmitting the measurement data. The primary aggregator receives 304 and the secondary aggregator receives 306 the measurement data from the BMIC wireless transmissions in accordance with the communication protocol.

Since the secondary aggregator is aware of the communication protocol timing in place between the primary aggregator and the BMICs 106, the secondary aggregator receives 306 the same measurement data that is wirelessly transmitted to the primary aggregator from the BMICs 106. In FIG. 3, the primary aggregator has both transmit (TX) and receive (RX) slots during each broadcast period whereas the secondary aggregator has only receive (RX) slots. The BMICs 106 receive measurement data from the corresponding battery modules 104 during a data acquisition slot 308 of each broadcast period, and then wirelessly transmit the measurement data to the primary aggregator during the receive window 304 of the primary aggregator.

Figure 4B:
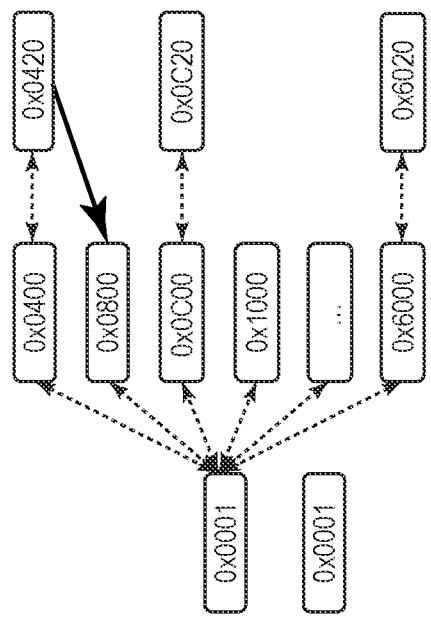
FIGS. 4A and 4B illustrate a wireless network of a battery management system before (FIG. 4A) and after (FIG. 4B) provisioning.
Figure 4A:
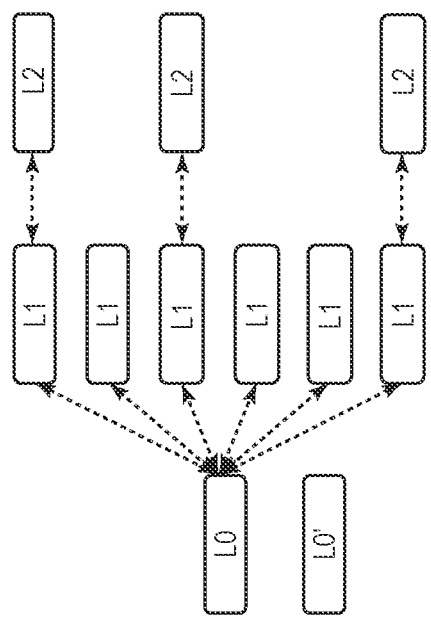

FIGS. 4A and 4B illustrate the wireless network 115 of the battery management system 100 before (FIG. 4A) and after (FIG. 4B) provisioning. The L0, L0' nodes are connected to the BMU 108. The L1 nodes are between the L2 nodes and the L0, L0' nodes, such that reliable RF transmission between the L0, L0' nodes and the L2 nodes is not possible. Accordingly, the system is configured such that data to/from the L2 nodes is delivered by the L1 nodes. The L0 node corresponds to the primary aggregator and the L0' node corresponds to the secondary aggregator described herein. The L1 and L2 nodes correspond to the peripheral wireless communication devices 114 included in or associated with the BMICs 106, for example. After provisioning, each network node L0, L1, L2 has an assigned address '0xNNNN'.

A network with only the L0 and L1 nodes provides the best latency in both the transmit (TX) and receive (RX) directions. The L2 nodes are not visible at the L0 node due to RF conditions. The L1 nodes relay data to/from the L2 nodes. To reduce the amount of traffic between the L0 node and an L1 node, the number of L2 nodes per L1 node may be limited. The number of nodes supported depends on the L0 node. The L1 nodes may use methods for fault tolerance and higher availability/throughput. By extension, these methods also apply to a redundant/secondary network of nodes. For example, a branch or even the entire network of L1 and L2 nodes may be duplicated for fault tolerance/availability/performance.

The L0' secondary node may employ algorithms/heuristics to detect a fault. For example, the L0' secondary node may determine that the L0 primary node has not transmitted for a 'supervision timeout' duration and may take over as the primary aggregator. If the wireless communication device 110/112 that was replaced as the primary aggregator comes online when the other wireless communication device 112/110 has taken over as the primary aggregator, that wireless communication device 110/112 may employ a 'sense' phase during which the device 110/112 checks whether the primary and secondary aggregator roles should be switched and whether the device 110/112 should become the secondary aggregator.

In the case of Bluetooth communication, the nodes L0, L1, L2 each have device information for operating in a Bluetooth network 115, including a unique network address '0xNNNN'. Conventionally, only a single L0 node is provided and the entire battery management process fails if the L0 node fails. To repair the system, a new L0 device is required and the network provisioning process must be performed again, where the provisioning includes pairing master (L0) and slave (L1/L2) BLE devices to form connections which in turn forms network information.

According to the embodiments described herein, one wireless communication device 110/112 serves as the L0 primary node and the other wireless communication device 112/110 serves as the L0' secondary node. Since the L0' secondary node stores the same device and network information as the L0 primary node, the L1 nodes recognize both the L0 and L0' nodes as a single primary aggregator. Since the L0' secondary node is configured to participate in the wireless network 115, the instant (hot) swap of the L0' secondary node for the L0 primary node may be performed without the BMU 108 having to first stop, shut down, or perform network provisioning.

Figure 5:
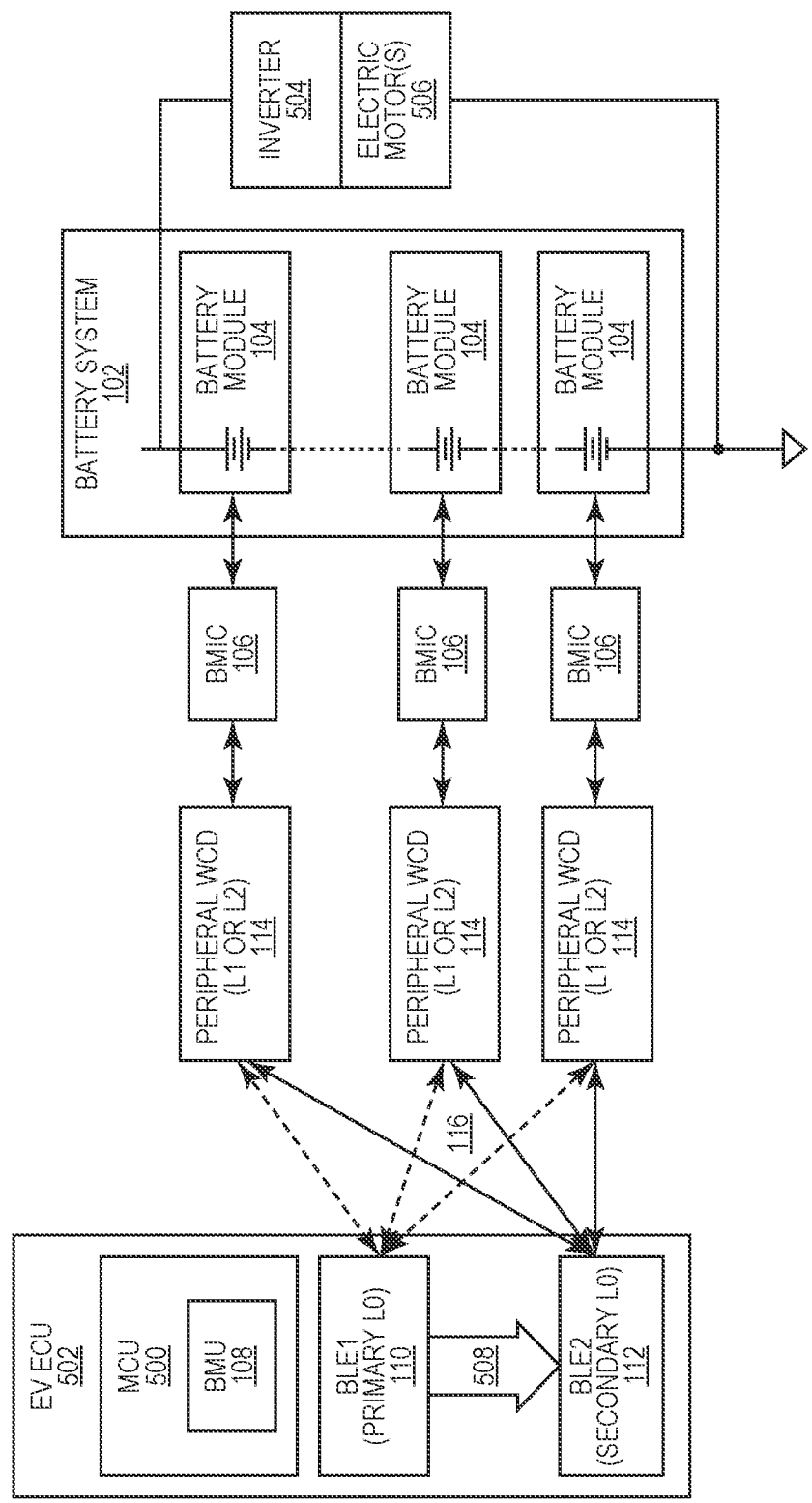
FIG. 5 illustrates a block diagram of another embodiment of a battery management system.

FIG. 5 illustrates an embodiment of swapping out the L0' secondary node for the L0 primary node by the battery management system 100, without the BMU 108 having to first stop, shut down, or perform network provisioning. In FIG. 5, the BMU 108 is included in or associated with a microcontroller unit (MCU) 500 of an electronic control unit (ECU) 502 of an electric vehicle (EV). The electric vehicle also includes an inverter 504 for driving one or more electric motors 506 using energy stored by the battery system 102.

The first wireless communication device 110 is shown in FIG. 5 as a BLE device configured as the primary aggregator ('Primary L0'). The second wireless communication device 112 is shown in FIG. 5 as a BLE device configured as the secondary aggregator ('Secondary L0'). As previously explained herein, the aggregator roles may be reversed in that the first wireless communication device 110/BLE1 may be configured as the secondary aggregator ('Primary L0') and the second wireless communication device 112/BLE2 may be configured as the primary aggregator.

The memory 118 of the first wireless communication device 110/BLE1 stores wireless network connectivity information for the primary aggregator and the BMICs 106. The memory 118 of the second wireless communication device 112/BLE2 stores a copy 508 of the wireless network connectivity information such that the second wireless communication device 112/BLE2 is prepared to replace the first wireless communication device 110/BLE1 as the primary aggregator without the battery management system 100 having to first stop, shut down, or reprovision. In one embodiment, the wireless network connectivity information includes a Bluetooth device address for the primary aggregator and the memory 118 of the second wireless communication device 112/BLE2 stores a copy 508 of the Bluetooth device address. For example, the wireless network connectivity information may include L0 information and network information, enabling a redundant layer 0 Bluetooth connection in the wireless battery management system 100.

As previously explained herein, the first wireless communication device 110/BLE1 may communicate the wireless network connectivity information to the second wireless communication device 112/BLE2 over a wired or wireless connection. For example, the processor 120 included in the wireless communication device 110/BLE1 or 112BLE2 configured as the primary aggregator may communicate, via the corresponding transceiver 116, the communication protocol timing information to the other wireless communication device 110/BLE1 or 112/BLE2 configured as the secondary aggregator. The processor 120 included in the wireless communication device 110/BLE1 or 112/BLE2 configured as the primary aggregator may communicate updates to the wireless network connectivity information via the corresponding transceiver 116. In the event of a fault or degraded performance at the wireless communication device 110/BLE1 or 112B/LE2 configured as the primary aggregator, the corresponding processor 120 may instruct the other wireless communication device 110/BLE1 or 112/BLE2 to assume the role of the primary aggregator.

In another embodiment, the processor 120 included in the wireless communication device 110/BLE1 or 112BLE2 configured as the secondary aggregator may monitor, via the corresponding transceiver 116, wireless transmissions from the primary aggregator to the BMICs 106 to determine timing of the communication protocol used by the primary aggregator and the BMICs 106 for wirelessly communicating the measurement data reported by the battery modules 104, e.g., as described above in connection with FIG. 3. The processor 120 included in the wireless communication device 110/BLE1 or 112/BLE2 configured as the secondary aggregator receives the measurement data wirelessly communicated by the BMICs 106 to the primary aggregator, via the corresponding transceiver 116, in accordance with timing of the communication protocol. For example, the processor 120 included in the wireless communication device 110/BLE1 or 112/BLE2 configured as the secondary aggregator may receive, via the corresponding transceiver 116, the measurement data during a receive window for the primary aggregator, e.g., as described above in connection with FIG. 3.

In another embodiment, the MCU 500 may control both the first and second wireless communication devices 110/BLE1 or 112/BLE2 and provide the wireless network connectivity information to the second wireless communication device 112/BLE2. For example, the first wireless communication device 110/BLE1 may inform the MCU 500 of updates to the wireless network connectivity information and the MCU 500 may communicate the updates to the second wireless communication device 112/BLE2.

The BMU 108 may detect a fault or degraded performance at the first wireless communication device 110/BLE1 and in response, instruct the second wireless communication device 112/BLE2 to replace the first wireless communication device 110/BLE1 as the primary aggregator.

Figure 6:
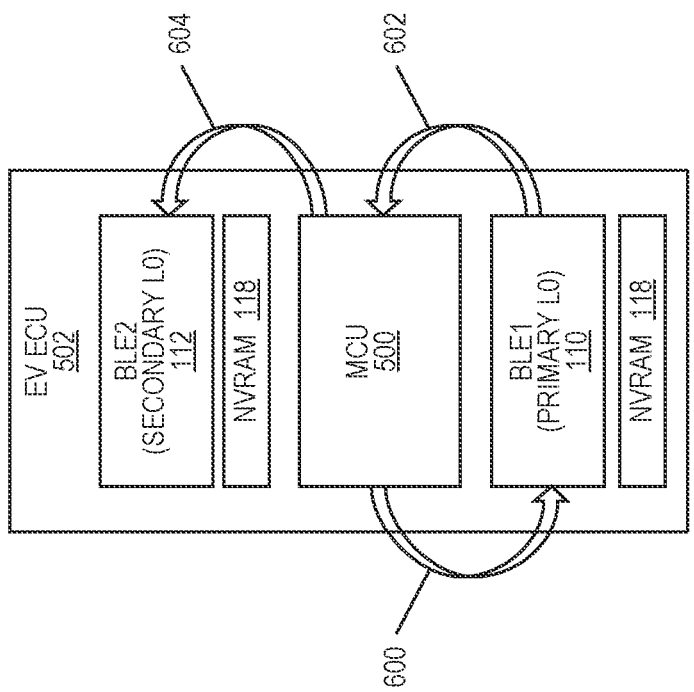
FIG. 6 illustrates an embodiment of maintaining wireless network connectivity information in primary and secondary aggregator devices of a battery management system.

FIG. 6 illustrates an embodiment of maintaining the wireless network connectivity information in both the first and second wireless communication devices 110/BLE1 and 112/BLE2, so that the role of primary aggregator can be changed without the BMU 108 having to first stop, shut down, or perform network provisioning. In FIG. 6, the MCU 500 monitors 600 the wireless communication device 110/BLE1 or 112/BLE2 configured as the primary aggregator for changes in the wireless network connectivity information. For example, the MCU 500 may perform an L0 availability check, a communication status check, or a BLE error check.

The memory 118 of the wireless communication device 110/BLE1 or 112/BLE2 configured as the primary aggregator may copy and store key information in a normal operating mode. For example, the memory 118 of the primary aggregator may store key information, network L1/L2 information, etc. The key information may include L0 information such as L0 device key, L0 address key, network address, etc. The network L1/L2 information may include node structure such as node address, UUID (universally unique identifier), link key, etc. The wireless network connectivity information stored in the memory 118 of the primary aggregator may also include encryption keys for the primary aggregator and the BMICs 106. The secondary WCD memory 118 stores a copy of the encryption keys so the secondary aggregator can mimic operation of the primary aggregator, including encrypted communication.

The processor 120 of the wireless communication device 110/BLE1 or 112/BLE2 configured as the primary aggregator may communicate 602 updates to the wireless network connectivity information to the MCU 500, e.g., when the memory 118 of the L0 primary node is updated. The MCU 500 communicates 604 the updated wireless network connectivity information received from the L0 primary node to the L0' secondary node. The L0' secondary node stores this information in its memory 118, so that the L0' secondary node can monitor wireless communication from the BMICs 106 to the L0 primary node, even if encryption is employed since the memory 118 of the L0' secondary node may store a copy of encryption keys used by the primary aggregator.

Although the present disclosure is not so limited, the following numbered examples demonstrate one or more aspects of the disclosure.

Example 1. A battery management system, comprising: a battery management unit; a plurality of battery management integrated circuits configured to receive measurement data from a plurality of battery modules; a first wireless communication device configured as a primary aggregator to receive wireless transmissions of the measurement data from the battery management integrated circuits and communicate the measurement data received by the first wireless communication device to the battery management unit; and a second wireless communication device configured as a secondary aggregator to monitor the wireless transmissions of the measurement data and communicate the measurement data received by the second wireless communication device to the battery management unit, wherein the battery management unit is configured to manage the battery modules based on the measurement data provided to the battery management unit.

Example 2. The battery management system of example 1, wherein the secondary aggregator is configured to monitor wireless transmissions from the primary aggregator to the battery management integrated circuits to determine timing of a communication protocol used by the primary aggregator and the battery management integrated circuits, and wherein the secondary aggregator is configured to extract the measurement data from the wireless transmissions in accordance with the timing of the communication protocol.

Example 3. The battery management system of example 1 or 2, wherein the primary aggregator is configured to communicate timing of a communication protocol to the secondary aggregator, wherein the timing of the communication protocol is used by the primary aggregator and the battery management integrated circuits, and wherein the secondary aggregator is configured to receive the measurement data from the wireless transmissions in accordance with the timing of the communication protocol.

Example 4. The battery management system of any of examples 1 through 3, wherein the battery management unit is configured to communicate timing of a communication protocol to the secondary aggregator and that is used by the primary aggregator and the battery management integrated circuits, and wherein the secondary aggregator is configured to receive the measurement data from the wireless transmissions in accordance with the timing of the communication protocol.

Example 5. The battery management system of any of examples 1 through 4, wherein during a transmit window for the primary aggregator, the primary aggregator is configured to wirelessly transmit communication protocol timing information to the battery management integrated circuits and the secondary aggregator is configured to monitor the wireless transmissions and receive the communication protocol timing information, and wherein during a receive window for the primary aggregator, the battery management integrated circuits are configured to wirelessly transmit the measurement data in accordance with the communication protocol timing information and both the primary aggregator and the secondary aggregator are configured to receive the measurement data from the wireless transmissions in accordance with the communication protocol timing information.

Example 6. The battery management system of any of examples 1 through 5, wherein the second wireless communication device is configured to replace the first wireless communication device as the primary aggregator without the battery management system having to first stop, shut down, or perform network provisioning.

Example 7. The battery management system of example 6, wherein the first wireless communication device is configured to store wireless network connectivity information for the primary aggregator and the battery management integrated circuits, and wherein the second wireless communication device is configured to store a copy of the wireless network connectivity information such that the second wireless communication device is prepared to replace the first wireless communication device as the primary aggregator without the battery management system having to first stop, shut down, or perform network provisioning.

Example 8. The battery management system of example 7, wherein the wireless network connectivity information includes a Bluetooth device address for the primary aggregator, and wherein the second wireless communication device is configured to store a copy of the Bluetooth device address.

Example 9. The battery management system of example 7 or 8, wherein the wireless network connectivity information includes encryption keys for the primary aggregator and the battery management integrated circuits, and wherein the second wireless communication device is configured to store a copy of the encryption keys.

Example 10. The battery management system of any of examples 7 through 9, wherein the first wireless communication device is configured to communicate the wireless network connectivity information to the second wireless communication device over a wired or wireless connection.

Example 11. The battery management system of any of examples 7 through 10, further comprising: a microcontroller configured to provide the wireless network connectivity information to the second wireless communication device.

Example 12. The battery management system of example 11, wherein the first wireless communication device is configured to inform the microcontroller of updates to the wireless network connectivity information, and wherein the microcontroller is configured to communicate the updates to the second wireless communication device.

Example 13. The battery management system of any of examples 6 through 12, wherein the battery management unit is configured to detect a fault or degraded performance at the first wireless communication device and in response, instruct the second wireless communication device to replace the first wireless communication device as the primary aggregator.

Example 14. The battery management system of any of examples 6 through 13, wherein the first wireless communication device is configured to instruct the second wireless communication device to take over as the primary aggregator.

Example 15. A method of battery management, comprising: receiving, at a plurality of battery management integrated circuits, measurement data from a plurality of battery modules; configuring a first wireless communication device as a primary aggregator and a second wireless communication device as a secondary aggregator; receiving wireless transmissions of the measurement data from the battery management integrated circuits at the first wireless communication device and communicating the measurement data received by the first wireless communication device to a battery management unit; monitoring the wireless transmissions of the measurement data by the second wireless communication device and communicating the measurement data received by the second wireless communication device to the battery management unit; and managing the battery modules based on the measurement data received by the battery management unit.

Example 16. The method of example 15, wherein monitoring the wireless transmissions of the measurement data by the second wireless communication device comprises: during a transmit window for the primary aggregator, receiving, at the secondary aggregator, communication protocol timing information wirelessly transmitted from the primary aggregator to the battery management integrated circuits; and during a receive window for the primary aggregator, receiving, at both the primary aggregator and the secondary aggregator, the measurement data wirelessly transmitted by the battery management integrated circuits in accordance with the communication protocol timing information.

Example 17. The method of example 15 or 16, further comprising: replacing the first wireless communication device as the primary aggregator with the second wireless communication device without first stopping, shutting down, or performing network provisioning.

Example 18. The method of any of examples 15 through 17, further comprising: storing, in the first wireless communication device, wireless network connectivity information for the primary aggregator and the battery management integrated circuits; and storing, in the second wireless communication device, a copy of the wireless network connectivity information such that the second wireless communication device is prepared to replace the first wireless communication device as the primary aggregator without first stopping, shutting down, or reprovisioning the battery management.

Example 19. A wireless communication device, comprising: a transceiver; memory configured to store configuration information that determines whether the wireless communication device is configured as a primary aggregator or a secondary aggregator of a battery management system; and a processor, wherein if the wireless communication device is configured as the primary aggregator, the processor is configured to coordinate wireless transmission of measurement data from a plurality of battery management integrated circuits to the wireless communication device and communicate the measurement data received by the transceiver to a battery management unit of the battery management system, wherein if the wireless communication device is configured as the secondary aggregator, the processor is configured to monitor, via the transceiver, the wireless transmission of the measurement data from the plurality of battery management integrated circuits to another wireless communication device configured as the primary aggregator and communicate the measurement data received by the transceiver to the battery management unit.

Example 20. The wireless communication device of example 19, wherein if the wireless communication device is configured as the secondary aggregator, the processor is configured to monitor, via the transceiver, wireless transmissions from the primary aggregator to the battery management integrated circuits to determine timing of a communication protocol used by the primary aggregator and the battery management integrated circuits, and receive the measurement data, via the transceiver, in accordance with the timing of the communication protocol.

Example 21. The wireless communication device of example 19 or 20, wherein if the wireless communication device is configured as the primary aggregator, the processor is configured to communicate, via the transceiver, communication protocol timing information to another wireless communication device configured as the secondary aggregator.

Example 22. The wireless communication device of any of examples 19 through 21, wherein if the wireless communication device is configured as the secondary aggregator, the processor is configured to monitor, via the transceiver, wireless transmissions from the primary aggregator to the battery management integrated circuits for communication protocol timing information.

Example 23. The wireless communication device of example 22, wherein if the wireless communication device is configured as the secondary aggregator, the processor is configured to receive, via the transceiver, the measurement data from the wireless transmissions in accordance with the communication protocol timing information during a receive window for the primary aggregator.

Example 24. The wireless communication device of any of examples 19 through 23, wherein the memory is configured to store wireless network connectivity information for the primary aggregator and the battery management integrated circuits, and wherein if the wireless communication device is configured as the secondary aggregator, the processor is configured to reconfigure the wireless communication device as the primary aggregator based on the wireless network connectivity information without the battery management system having to first stop, shut down, or perform network provisioning.

Example 25. The wireless communication device of example 24, wherein if the wireless communication device is configured as the primary aggregator, the processor is configured to communicate updates to the wireless network connectivity information via the transceiver.

Example 26. The wireless communication device of any of examples 19 through 25, wherein if the wireless communication device is configured as the primary aggregator and in the event of a fault or degraded performance at the wireless communication device, the processor is configured to instruct a redundant wireless communication device to replace the wireless communication device as the primary aggregator.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to mean all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A battery management system, comprising:
    a battery management unit;
    a plurality of battery management integrated circuits configured to receive measurement data from a plurality of battery modules;
    a first wireless communication device configured as a primary aggregator to receive wireless transmissions of the measurement data from the battery management integrated circuits and communicate the measurement data received by the first wireless communication device to the battery management unit; and
    a second wireless communication device configured as a secondary aggregator to monitor the wireless transmissions of the measurement data from the battery management integrated circuits to the primary aggregator and communicate the measurement data received by the second wireless communication device to the battery management unit,
    wherein the battery management unit is configured to manage the battery modules based on the measurement data provided to the battery management unit.

2. The battery management system of claim 1, wherein the secondary aggregator is configured to monitor wireless transmissions from the primary aggregator to the battery management integrated circuits to determine timing of a communication protocol used by the primary aggregator and the battery management integrated circuits that wirelessly transmit the measurement data, and wherein the secondary aggregator is configured to receive the measurement data from the wireless transmissions in accordance with the timing of the communication protocol.

3. The battery management system of claim 1, wherein the primary aggregator is configured to communicate timing of a communication protocol to the secondary aggregator, wherein the timing of the communication protocol is used by the primary aggregator and the battery management integrated circuits, and wherein the secondary aggregator is configured to receive the measurement data from the wireless transmissions in accordance with the timing of the communication protocol.

4. The battery management system of claim 1, wherein the battery management unit is configured to communicate timing of a communication protocol to the secondary aggregator and that is used by the primary aggregator and the battery management integrated circuits, and wherein the secondary aggregator is configured to receive the measurement data from the wireless transmissions in accordance with the timing of the communication protocol.

5. The battery management system of claim 1, wherein during a transmit window for the primary aggregator, the primary aggregator is configured to wirelessly transmit communication protocol timing information to the battery management integrated circuits and the secondary aggregator is configured to monitor the wireless transmissions and receive the communication protocol timing information, and wherein during a receive window for the primary aggregator, the battery management integrated circuits are configured to wirelessly transmit the measurement data in accordance with the communication protocol timing information and both the primary aggregator and the secondary aggregator are configured to receive the measurement data from the wireless transmissions in accordance with the communication protocol timing information.

6. The battery management system of claim 1, wherein the second wireless communication device is configured to replace the first wireless communication device as the primary aggregator without the battery management system having to first stop, shut down, or perform network provisioning.

7. The battery management system of claim 6, wherein the first wireless communication device is configured to store wireless network connectivity information for the primary aggregator and the battery management integrated circuits, and wherein the second wireless communication device is configured to store a copy of the wireless network connectivity information such that the second wireless communication device is prepared to replace the first wireless communication device as the primary aggregator without the battery management system having to first stop, shut down, or perform network provisioning.

8. The battery management system of claim 7, wherein the wireless network connectivity information includes a Bluetooth device address for the primary aggregator, and wherein the second wireless communication device is configured to store a copy of the Bluetooth device address.

9. The battery management system of claim 7, wherein the wireless network connectivity information includes encryption keys for the primary aggregator and the battery management integrated circuits, and wherein the second wireless communication device is configured to store a copy of the encryption keys.

10. The battery management system of claim 7, wherein the first wireless communication device is configured to communicate the wireless network connectivity information to the second wireless communication device over a wired or wireless connection.

11. The battery management system of claim 7, further comprising: a microcontroller configured to provide the wireless network connectivity information to the second wireless communication device.

12. The battery management system of claim 11, wherein the first wireless communication device is configured to inform the microcontroller of updates to the wireless network connectivity information, and wherein the microcontroller is configured to communicate the updates to the second wireless communication device.

13. The battery management system of claim 6, wherein the battery management unit is configured to detect a fault or degraded performance at the first wireless communication device and in response, instruct the second wireless communication device to replace the first wireless communication device as the primary aggregator.

14. The battery management system of claim 6, wherein the first wireless communication device is configured to instruct the second wireless communication device to take over as the primary aggregator.

15. A method of battery management, comprising:
receiving, at a plurality of battery management integrated circuits, measurement data from a plurality of battery modules;
configuring a first wireless communication device as a primary aggregator and a second wireless communication device as a secondary aggregator;
receiving wireless transmissions of the measurement data from the battery management integrated circuits at the first wireless communication device and communicating the measurement data received by the first wireless communication device to a battery management unit;
monitoring the wireless transmissions of the measurement data from the battery management integrated circuits to the primary aggregator by the second wireless communication device and communicating the measurement data received by the second wireless communication device to the battery management unit; and
managing the battery modules based on the measurement data received by the battery management unit.

16. The method of claim 15, wherein monitoring the wireless transmissions of the measurement data by the second wireless communication device comprises:
during a transmit window for the primary aggregator, receiving, at the secondary aggregator, communication protocol timing information wirelessly transmitted from the primary aggregator to the battery management integrated circuits; and
during a receive window for the primary aggregator, receiving, at both the primary aggregator and the secondary aggregator, the measurement data wirelessly transmitted by the battery management integrated circuits in accordance with the communication protocol timing information.

17. The method of claim 15, further comprising:
replacing the first wireless communication device as the primary aggregator with the second wireless communication device without first stopping, shutting down, or performing network provisioning.

18. The method of claim 15, further comprising:
storing, in the first wireless communication device, wireless network connectivity information for the primary aggregator and the battery management integrated circuits; and
storing, in the second wireless communication device, a copy of the wireless network connectivity information such that the second wireless communication device is prepared to replace the first wireless communication device as the primary aggregator without first stopping, shutting down, or reprovisioning the battery management.

19. A wireless communication device, comprising:
a transceiver;
memory configured to store configuration information that determines whether the wireless communication device is configured as a primary aggregator or a secondary aggregator of a battery management system; and
a processor,
wherein if the wireless communication device is configured as the primary aggregator, the processor is configured to coordinate wireless transmission of measurement data from a plurality of battery management integrated circuits to the wireless communication device and communicate the measurement data received by the transceiver to a battery management unit of the battery management system,
wherein if the wireless communication device is configured as the secondary aggregator, the processor is configured to monitor, via the transceiver, the wireless transmissions of the measurement data from the plurality of battery management integrated circuits to another wireless communication device configured as the primary aggregator and communicate the measurement data received by the transceiver to the battery management unit.

20. The wireless communication device of claim 19, wherein if the wireless communication device is configured as the secondary aggregator, the processor is configured to monitor, via the transceiver, wireless transmissions from the primary aggregator to the battery management integrated circuits to determine timing of a communication protocol used by the primary aggregator and the battery management integrated circuits, and receive the measurement data, via the transceiver, in accordance with the timing of the communication protocol.

21. The wireless communication device of claim 19, wherein if the wireless communication device is configured as the primary aggregator, the processor is configured to communicate, via the transceiver, communication protocol timing information to another wireless communication device configured as the secondary aggregator.

22. The wireless communication device of claim 19, wherein if the wireless communication device is configured as the secondary aggregator, the processor is configured to monitor, via the transceiver, wireless transmissions from the primary aggregator to the battery management integrated circuits for communication protocol timing information.

23. The wireless communication device of claim 22, wherein if the wireless communication device is configured as the secondary aggregator, the processor is configured to receive, via the transceiver, the measurement data from the wireless transmissions in accordance with the communication protocol timing information during a receive window for the primary aggregator.

24. The wireless communication device of claim 19, wherein the memory is configured to store wireless network connectivity information for the primary aggregator and the battery management integrated circuits, and wherein if the wireless communication device is configured as the secondary aggregator, the processor is configured to reconfigure the wireless communication device as the primary aggregator based on the wireless network connectivity information without the battery management system having to first stop, shut down, or perform network provisioning.

25. The wireless communication device of claim 24, wherein if the wireless communication device is configured as the primary aggregator, the processor is configured to communicate updates to the wireless network connectivity information via the transceiver.

26. The wireless communication device of claim 19, wherein if the wireless communication device is configured as the primary aggregator and in the event of a fault or degraded performance at the wireless communication device, the processor is configured to instruct a secondary wireless communication device to replace the wireless communication device as the primary aggregator.

\* \* \* \* \*